United States Patent [19]

Pouit

[11] Patent Number: 4,472,054
[45] Date of Patent: Sep. 18, 1984

[54] METHOD AND APPARATUS FOR DETERMINING A PARAMETER OF ATTITUDE OF A BODY

[75] Inventor: Christian J. J. Pouit, Elancourt, France

[73] Assignee: Office National d'Etudes et de Recherches Aerospatiales, Chatillon, France

[21] Appl. No.: 290,367

[22] Filed: Aug. 5, 1981

[30] Foreign Application Priority Data

Aug. 7, 1980 [FR] France .................... 80 17495

[51] Int. Cl.³ .............................................. G01B 9/02
[52] U.S. Cl. ..................................... 356/352; 356/363
[58] Field of Search ............... 356/346, 352, 363, 152; 244/3.16, 3.17, 171

[56] References Cited

U.S. PATENT DOCUMENTS 3,824,018 7/1974 Crane, Jr. ............................. 356/352
3,914,055 10/1975 Wolga et al. ......................... 356/346
4,227,807 10/1980 Pond et al. ........................ 356/363 X
4,355,898 10/1982 Dakin .................................. 356/346

Primary Examiner—William L. Sikes
Assistant Examiner—Matthew W. Koren
Attorney, Agent, or Firm—Roberts Spiecens & Cohen

[57] ABSTRACT

In order to determine, from a distance, at least one angle characteristic of the attitude of a body, the body is provided with an optical system comprising an interferential filter and a retroreflector. The body is aimed at with an incident beam of polychromatic light which is sent back by the optical system as a beam the light of which has a frequency spectrum which is characteristic of the angle of incidence of the beam sent on the optical system. Various means for analyzing this frequency spectrum are provided in order to derive the desired angular information therefrom. In particular an interferential filter may be used which is identical with that mounted on the body sighted.

8 Claims, 8 Drawing Figures

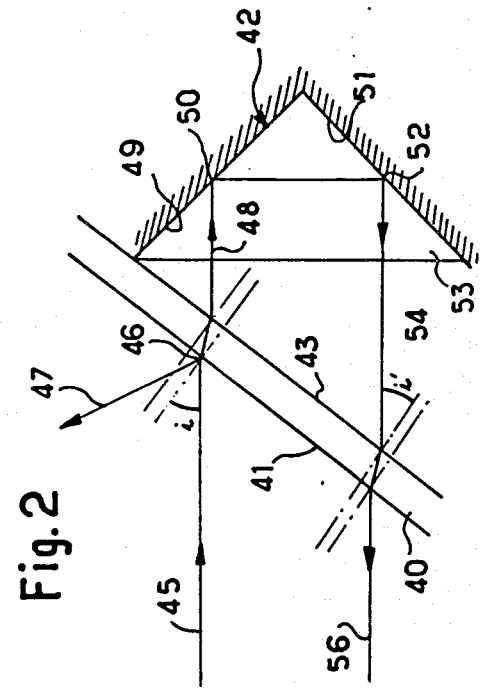
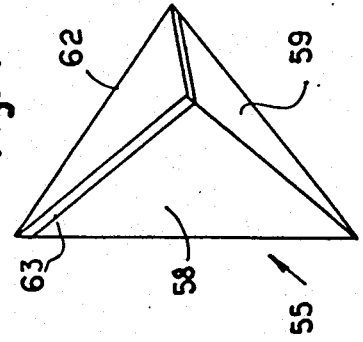
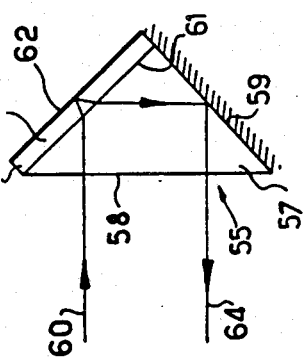
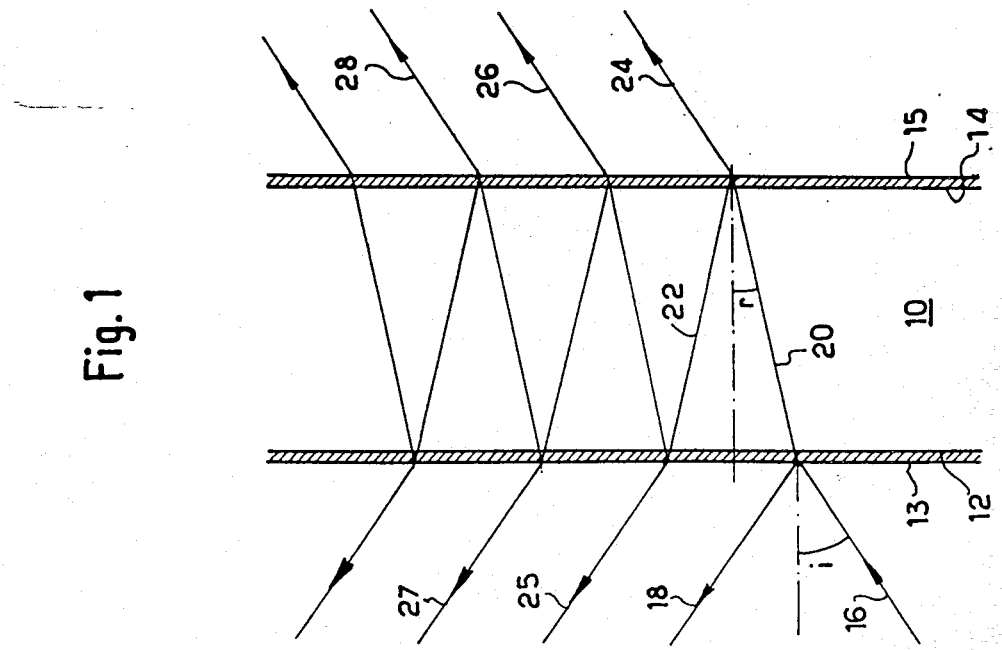

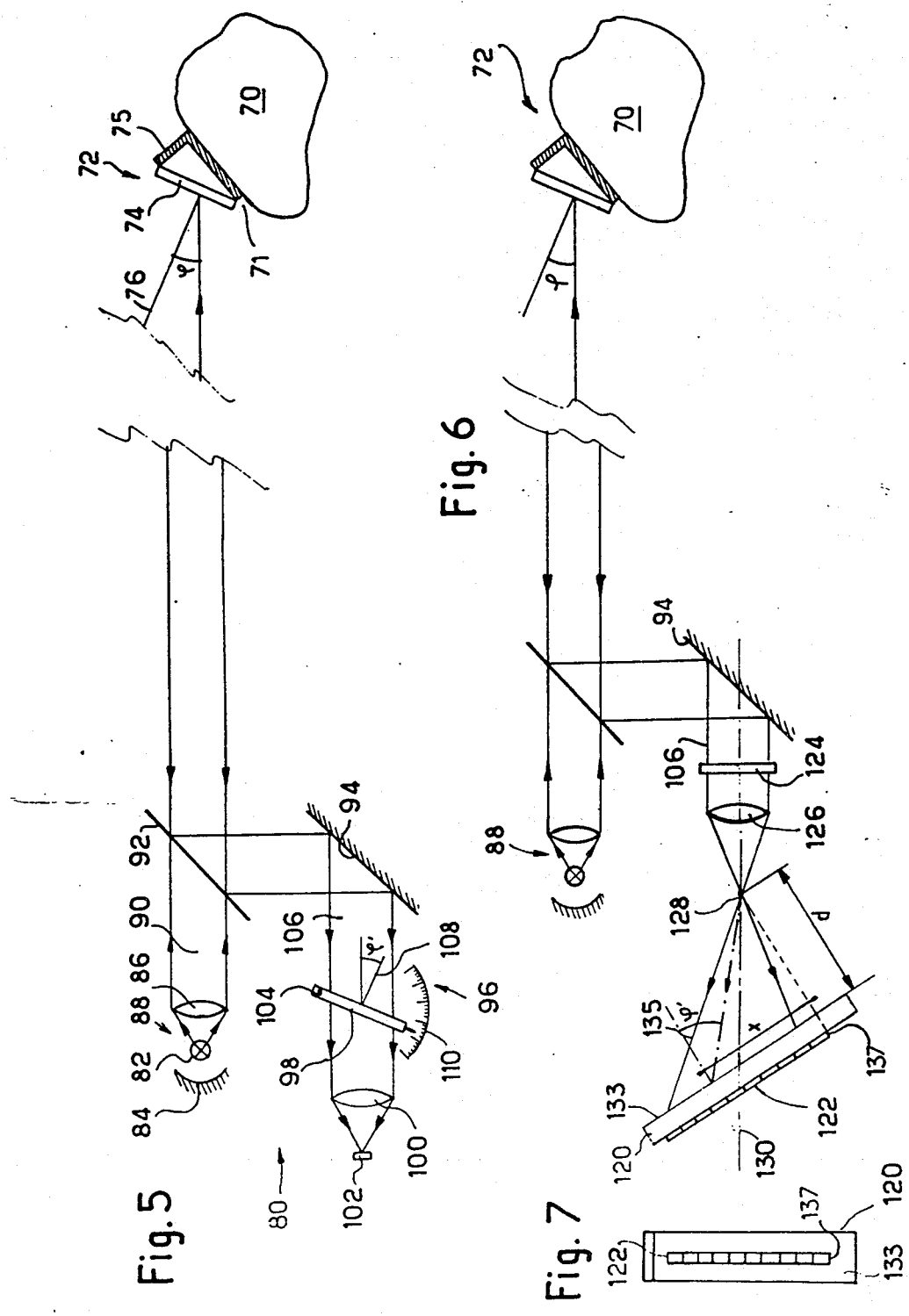

METHOD AND APPARATUS FOR DETERMINING A PARAMETER OF ATTITUDE OF A BODY

In order to determine, from a distance, at least one angle characteristic of the attitude of a body, the body is provided with an optical system comprising an interferential filter and a retroreflector. The body is aimed at with an incident beam of polychromatic light which is sent back by the optical system as a beam the light having a frequency spectrum which is characteristic of the angle of incidence of the beam sent on the optical system. Various means for analysing this frequency spectrum are provided in order to derive the desired angular information therefrom. In particular an interferential filter may be used which is identical with that mounted on the body sighted.

FIELD OF THE INVENTION

The present invention relates to the measurement of angles and is particularly involved in the remote determination of at least one angle characteristic of the angular position, or "attitude", of a body.

The position of a body in space relative to a system of axes can be defined by six parameters, three of which representing the coordinates of its center of gravity, for example, and the three other characterizing its angular position or "attitude" about its center of gravity by defining, for example, the orientation of a system of axes associated with said body relative to the reference axes system.

If such a body is a remote object, or not readily accessible, it may be difficult to determine from a distance one or several of its attitude characteristic parameters, even when the position of its center of gravity in space is known otherwise by conventional locating means, for example radar. The present inventions provides the possibility of carrying out such a determination with accuracy for one at least of the attitude characteristic parameters of a body.

OBJECTS AND SUMMARY OF THE INVENTION

According to the invention, for determining an attitude parameter of a body, a light beam is directed to an optical encoder which is attached to the body and arranged for producing a resultant light beam the spectral composition of which depends on the the attitude of the body. The parameter to be identified is obtained by analyzing the spectrum of the signal produced by the encoder and by comparing it with spectrum standards.

Such an attitude optical encoder of a body, according to an aspect of the invention, is arranged for receiving a polychromatic light beam, under an incidence which is a function of the body attitude, and is characterized in that it is formed of an optical device comprising an interference filter producing a resultant light beam the frequency spectrum of which is characteristic of said incidence.

As is well known, interference filters are made of sheets or plates with parallel faces, well known in metrology for the very accurate measurement of lengths. They have the property of carrying out a rigorous frequency selection in the spectrum of an incident light in order to pass through only a light comprising a finite number of distinct wave lengths defined very accurately as a function, in particular, of the thickness of the plate.

According to the invention, such a filter is to be used for the determination of the attitude of a body by taking advantage of the fact that the wavelengths of the transmitted light beams are also a function of the angle of incidence of the light striking the inlet face of the filter. Thus can be determined the angle of incidence of a polychromatic light beam on the body one attitude parameter of which it is desired to know, by analyzing the frequency spectrum of the light emitted by the interference filter.

According to an embodiment in which the incident beam is is sent to a mobile body in a direction of sight, the optical encoder in which is mounted the interference filter comprises a retroreflecting means so as to transmit the resultant beam back along the line of sight, but in reverse to the incident beam. Thus, the light beam sent back by the encoder can be picked up at the sighting point, and its frequency spectrum can be analyzed.

According to a further feature, the optical encoder is moreover provided with a polarizer in order to polarize the resultant beam in a plane the orientation of which supplies a second indication which is characteristic of the attitude of the body to which it is associated.

The invention relates also to a remote measuring method of an angle characteristic of the attitude of a body, whereby a polychromatic light beam is sent on an optical system attached to the body, with an incidence which is a function of the attitude of said body, characterized in that, the optical system comprising an interferential filter which produces a resultant light beam the frequency spectrum of which is characteristic of said incidence, the resultant beam is captured and its frequency spectrum is analyzed for deriving therefrom an angle measurement characteristic of the body attitude.

Preferably, a white light incident beam is used. For analyzing the frequency spectrum of the resultant beam, it is advantageously foreseen to receive it on a second interferential filter and to vary the angle of incidence of the resultant beam on said filter by modifying the orientation of the latter. The detection of the light energy levels at the outlet of the filter as a function of the incidence allows decoding the information contained in the frequency spectrum of the light of the resultant beam.

An object of the invention is also an apparatus for the remote measurement of an angle characteristic of the attitude of a body, comprising a light source adapted for sending a polychromatic light beam, with an incidence which is a function of the attitude of said body relative to a reference position, on an optical system, which is characterized in that it comprises an optical encoder attached to the body and including an interferential filter for producing, from the received light beam, a resultant beam the spectrum of which is a function of said incidence, and a receiver comprising a detector responsive to the frequency spectrum of said resultant beam for providing said characteristic angle measurement.

According to a further characteristic feature, the detector comprises an interferential filter of the same type, transparent or reflective, as that which is provided on the optical encoder and detection means of the light energy level at the outlet of said interferential filter.

Various ways of using said detector with interferential filter are provided for exploiting the energy level indications supplied by the detection means as a function of the incidence of light rays issued from the resultant beam on said second interferential filter, so as to decode the information contained in the frequency spectrum of said resultant beam.

Advantageously, the receiver is also provided with an orientable polarized light analyser so as to detect the orientation of the plane according which the light of the resultant beam is polarized by a polarizer associated with the optical system attached to the body.

BRIEF DESCRIPTION OF THE DRAWINGS

The following description is given by way of example and reference is made to the accompanying drawings wherein:

FIG. 1 is a schematic view of an interferential filter;

FIG. 2 is a schematic view of an optical encoder with a retroreflector according to the invention;

FIGS. 3 and 4 are views, respectively in section and in perspective, of an alternative embodiment of an optical encoder according to the invention;

FIG. 5 is a principal schematic veiw of apparatus for determining the angular position of a body according to the invention;

FIGS. 6 and 7 illustrate an alternative embodiment of the apparatus of FIG. 5;

DETAILED DESCRIPTION OF THE EMBODIMENTS

Figure 8:
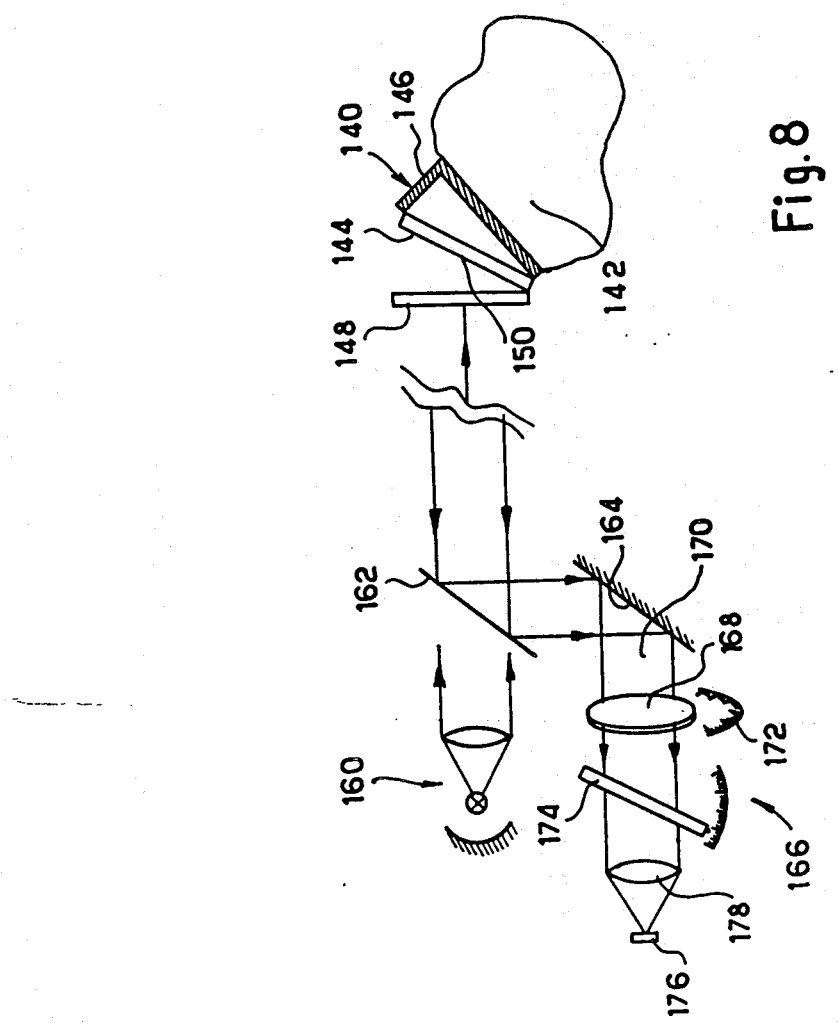
FIG. 8 shows schematically another embodiment of the apparatus putting in practice the principles of the invention.

A known interferential filter (FIG. 1) of the type used in the PEROT & FABRY interferometers comprises a plate 10 with parallel faces 12 and 14 made of a transparent material having a refraction index n, and each of the faces 12 and 14 of which is coated with a fine layer, respectively 13 and 15, of a reflecting coating, sufficiently thin for letting through a portion of the light incident on the corresponding face.

When an incident beam of polychromatic light, symbolized by beam 16, strikes face 12 of the plate, the largest portion of its energy is reflected directly by the layer 13 in the direction symbolized by the reflected ray 18. The non reflected energy is refracted inside the plate in the direction of the ray 20 and is subjected in turn, for part of it, to a reflection on the layer 15 in the direction of light ray 22, and for another part to a refraction in the direction of light ray 24 which comes out of plate 10 parallel to ray 16. The light corresponding to ray 22 can, in turn, be subjected when in contact with the reflecting layer 13 to a reflection inside the plate, or to a refraction, and so forth. By 25, 27, etc. are designated the rays issued from face 12 in a direction parallel to the reflected ray 18, after one or several trajectories in plate 10, and by 24, 26, 28, etc. the rays coming out of face 14 parallel to ray 24 after at least one trajectory in plate 10.

According to a fundamental property of interferential filters, the light of rays 24, 26, 28 has a frequency spectrum limited to a number of spectral rays well determined (monochromatic) which are the only ones to be admitted through the filter. The wavelengths for which the plate 10 is thus transparent to the light of ray 16 are provided by the relation:

$$K\lambda = 2ne \cos r \quad (1)$$

where:
K is an integer,
λ is a wavelength,
n is the index of the plate,
e is the thickness of the plate,
r is the angle of incidence of ray 20 on face 14 inside the plate; this angle is related to the angle of incidence i of ray 16 on the plate by the relation:

$$\sin i = n \sin r \quad (2)$$

When the light of the incident beam 16 is white and is therefore characterized by a continuous frequency spectrum, the light which is constituent of rays 24, 26 and 28 is formed by the superposition of monochromatic lines (band spectrum), the frequencies F1, F2; ... Fk of which are given by the following formula:

$$F_k = \frac{k}{2ne} \; \frac{1}{\cos \cdot r} \times C \quad (3)$$

C being the speed of light.

If one considers the light from the inlet face 12 of plate 10, the light of rays 25, 27, etc. is composed of rays which are also monochromatic and comply with the previous formula but in phase opposition with the light of the main reflected ray 18. The light collected at the outlet of face 12 of plate 10 has a spectrum with dark lines which correspond to frequencies the energy of which is attenuated by the waves whose phase is opposite to that of rays 25 and 27.

Thus, when a beam of polychromatic light is projected on an interferential filter of the type shown in FIG. 1 and mounted on a remote body, the frequency spectrum of the light coming out from the filter contains an information on the angle of incidence i of the beam on the plate constituting the filter, according to equations (1) and (2). Thus, said plate forms an optical encoder of an angular parameter characteristic of the angular position or "attitude" of a body relative to the direction of the incident beam. This optical encoder can operate by refraction or reflection according to whether it is the light coming out from the filter on the side opposite to the incident beam relative to the plate, or from the same side, which is chosen to be captured.

An optical encoder of an attitude parameter according to the invention (FIG. 2) comprises an interferential filter 40 and a retroreflecting trirectangular or trihedral mirror 42 comprising three plane mirrors the reflecting faces of which are perpendicular to each other and turned towards the inside of the trihedral. Such a trihedral possesses the known property of reflecting any incident ray which strikes any one of its reflecting faces in parallel back in the opposite direction, as long as the incident ray remains within an angular range of ±30° relative to the axis of said trihedral. The plate 40 is placed in front of the trihedral 42 on the path of an incident light beam symbolized by a ray 45 which is striking an inlet face 41 of the plate at point 46 with an angle of incidence i. A portion of the light of beam 45 is reflected by the plate in the direction of arrow 47 while another portion, after having travelled through plate 40, comes out from its face 43 in the direction of an emerging ray 48 and strikes one of faces 49 of the trihedral 42 at point 50. After reflection, the beam 48 strikes another face 51 of the trihedral at point 52 for giving rise to a reflected ray 54 which is parallel and in the reverse direction to ray 48 which strikes the inner face 43 of plate 40 under an incidence i' equal to i and comes out again according to a ray 56 which is parallel and in the opposite direction to ray 45. For the simplification of the figure, it has been assumed that the ray 45 is parallel to the plane of the third reflecting face 53 of the trihedral 42 and is only subjected to two reflections inside the latter. In the general case, the ray 56 is derived from ray 45 after three reflections on the faces of the trihedral 42.

The energy of the light which is constituent of ray 48 is practically zero for all the wavelengths, with the exception of a finite number of rays the frequencies of which are given by relation (3). The spectrum of said light is a function of the angle of incidence i of ray 45 on the perpendicular to face 41 of plate 40. By virtue of the properties of the retroreflecting trihedral 42, the ray 54 crosses again the plate 40 in the reverse direction. Thus, the spectral composition of the radiation which is present at the outlet of the optical encoder formed by the interferential filter 40 and the trihedral 42 contains a coded information on the value of an attitude parameter of the body.

An alternative embodiment of an optical encoder (FIGS. 3 and 4) uses a interferential filter operating by reflection. It comprises a trirectangular trihedral 55 made of a transparent material such as glass, having two faces 57 and 59 coated with a reflecting coating and a third face 61 orthogonal to the two first faces, and on which is bonded an interferential filter plate 63.

In operation, a beam 60 of incident white light falls on the inlet dioptre 58 of trihedral 55 and crosses it so as to meet face 61 of the latter. A portion of the energy of the incident beam penetrates plate 63 and is reflected by face 62 of said plate which is opposite face 61 of the trihedral and comes back inside the trihedral in order to mix with the light directly reflected by face 61.

The resultant light is reflected on face 59 and comes out from the trihedral via dioptre 58 according to the direction of the emerging ray 64 but travelling in the opposite direction to that of beam 60. The spectrum of the light of the emerging ray 64 comprises dark lines corresponding to wavelengths which have been attenuated by rays in phase opposition having passed through the interferential filter 63. This extinction, or attenuation, spectrum carries an information on the angle of incidence of beam 60 on face 61 of filter 63.

In this last embodiment of the encoder, the interferential filter 63 can be formed by a deposit of a thin transparent layer, for example of a plastics material, on the previously metallized face 61, the other face 62 being then coated with a corresponding metallic deposit. As in the case of FIG. 2, it has been assumed that the trihedral 55 shown on FIG. 3 was cut by a plane parallel to its face 57, the rays 62, 64 propagating in a plane parallel to said face.

For carrying out the remote measurement of an angle characteristic of the position of a body 70, an encoder 72 (FIG. 5) is connected to a face 71 of said body. It comprises an interferential filter composed of a plate 74 of the previously described type, placed in front of a retroreflecting trihedral 75. The perpendicular 76 to plate 74 defines an axis of reference for spotting an angular position parameter of body 70. In order to follow from a distance the orientation variations of said body 70 with the transmitter 72, an emitting-receiving apparatus 80 comprises a source of white light 82 associated with a concave reflector 84 and a converging lens 86 for forming a light emitter 88 adapted for sending a beam of parallel white light 90 according to an aiming or sighting axis which can be pointed towards the transmitter 72 associated with body 70 by using a tracking platform not shown. The beam 90 passes through a semi-transparent plate (half-silvered mirror) 92 at the outlet of emitter 88 and strikes filter 74 under an angle of incidence $\phi$ relative to the perpendicular 76. To this beam corresponds, at the outlet of transmitter 72, a resultant beam sent back towards the semi-transparent plate 92 which reflects it in the direction of a mirror 94, inclined by 45° at the inlet of a receiving and decoding device 96.

The device 96 comprises also, on the path of the beam reflected by mirror 94, an interferential filter 98 identical to filter 74, followed by a convergent lens 100 at the focus of which is disposed a light energy detector 102. The interferential filter 98 is rotatably mounted about an axis 104, perpendicular to the plane of the figure in this example, so as to allow varying the angle of incidence $\phi'$ of beam 106 reflected by mirror 94 relative to the perpendicular 108 on filter 98. A device comprising a graduated scale 110 allows measuring the angular position of the filter plate 98 about its axis 104 for providing a measurement of angle $\phi'$.

The frequency spectrum of beam 106 which is striking the interferential filter 98 is characteristic of the angle of incidence $\phi$ of the incident beam 90 on encoder 72. The filter 98 which operates by transmission as filter 74 is transparent to the energy of beam 106 when the angle $\phi'$ is equal to angle $\phi$.

Consequently, when the energy received by detector 102 is maximum, the inclination of axis 108 over the axis of the beam issued from mirror 94 is a measure of angle $\phi$. Moreover, it is established that if, for the same orientation of body 70 in space, and therefore of axis 76 relative to a reference related to the sighting point, the direction of the sighting line varies, the angle $\phi'$ varies but the orientation of axis 108 relative to said reference related to the sighting point is not modified.

Thus, for example, if the axis of rotation 104 of filter 98 is perpendicular to the sighting or aiming plane, as defined by the vertical at the sighting or aiming location and the sighting or aiming line, and if it is assumed that the orientation of axis 76 varies by remaining in said sighting plane and body 70 moves, the axis 108 corresponding to the maximum detected luminous energy remains constantly parallel to axis 76 of which it reproduces therefore exactly the orientation.

The measurement of angle $\phi'$ can be carried out with a very great accuracy with the assistance of an angular vernier associated with the graduated scale 110, as in the interferometry length displacement measurement methods, the maximum of light intensity corresponding to the condition of transparency of plate 98 for the light of the resultant beam 106 being extremely sharp. The thicker the plates 74 and 104, the greater the resolution of the determination of the angle to be detected.

According to an alternative embodiment of a decoding system of the information contained in the frequency spectrum of the resultant beam, notably with a view to obtaining a quicker determination of angle $\phi$, the resultant beam 106 issued from encoder 72 is transformed into a beam of diverging rays which are projected on an interferential plate 120 (FIG. 6) operating by transmission, the outlet face of which has been provided with an array or bar of photodetecting diodes 122, along a line parallel to the plane of FIG. 6 (FIG. 7). The beam 106 issued from the receiving mirror 94 is projected on an assembly of lenses 124 and 126 with axes parallel to the plane of the Figure for concentrating the rays on the diode array 122. The plate 120 is inclined over axis 130 of lens 126 and is at a distance d of the focus 128 of lens 126. The diverging beam from focus 128 is incident on the inlet face 133 of the plate and aligned with the diode array 122 (FIG. 7). The inclination of the plate is such that each of the rays of the diverging beam 135 issued from focus 128 strikes the plate under a different angle. Amongst said rays, practically one only has an incidence φ' on face 133 of the plate corresponding to the angular information contained in the frequency spectrum of the light composing beam 135 and, consequently, able to travel across plate 120. It strikes one of the diodes of array 122 the position of which relative to the origin 137 of said array (said origin being at distance d of focus 128 perpendicularly to plate 120) allows determining the value of the corresponding angle φ', according to the formula x=d tg φ' where x is the abscissa of the excited diode in the array 122 relative to the origin 137. The electronic locating of the excited diode in array 135 allows following permanently the variations of orientation of the transmitter.

According to an improvement, an optical encoder 140 (FIG. 8) is associated with a body 142 and comprises, further to an interferential filter plate 144 and a retroreflecting trihedral 146, a light polarizing plate 148 placed in front of the interferential filter and preferably oriented perpendicularly to the optical axis of the trihedral.

As an alternative, the polarizer plate 148 is bonded to the interferential plate 144.

The optical system formed by plates 144 and 148 and the trihedral 146 receives an incident beam of non polarized polychromatic light from an emitter 160 through a semi-transparent plate (half-silvered mirror) 162 and sends back a beam of polarized light with a coded frequency spectrum on the semi-transparent plate 162. Said beam is transmitted through a return mirror 164 to a decoding system 166 comprising an analyzer plate 168 in the path of the resultant beam 170, rotatably mounted about an axis parallel to that of beam 170 (parallel to the plane of the figure) and the angular position of which can be measured on a circular scale 172. The beam out of analyzer 168 is then received on an orientable interferential filter plate 174, similar to plate 98 of FIG. 5, followed by a converging lens 178 and a light energy detector 176 for determining the angle of the incident beam out of emitter 160 with axis 150, as explained previously. The rotation of analyzer 168 allows determining the orientation of the polarization plane of the beam sent back by transmitter or encoder 140 relative to a reference axis in the plane of rotation of analyzer 168.

Thus, for a remote determination of an angular position, or attitude, parameter of a remote body, the optical encoder which is fixed to the body is sighted from a measurement location so as to send to it a beam of white light and the light beam which is sent back by said encoder is analyzed for determining an attitude angle. When this analyzis is carried out with the assistance of an orientable interferential filter plate such as 104 of FIG. 5, the angular position of said plate relative to a reference corresponding to the decoding or the received frequency spectrum depends only on the position of axis 76 relative to this reference and not on the direction of the sighting line relative to axis 76. Generally, the device described is not sensitive to the displacements of the body which do not modify its angular position.

For a mobile body such as a flying object for example for which one desires to determine an attitude parameter and the angular position of which can vary rapidly within a wide range, it is contemplated to servo-control the orientation of the detector interferential filter plate associated with the receiver as a function of the value of the measured angle, so as to follow the angular displacement of the tracked body. This servo-control can be carried out continuously as the desired characteristic angle is being measured, or by increments, each time the variation of said angle exceeds a predetermined threshold. To this effect, a decoding interferential filter placed at the receiving station and its orientation device can be fixed on an orientable stand driven by a motor servo-controlled by a signal representative of the value of the angle decoded by the filter. In this case, the value of desired attitude characteristic angle is represented by the sum of the filter angular displacement relative to its orientation device (rotation of plate 98 about axis 104 for example) and of the angular displacement of the stand.

Of course, it is possible to apply the measurement technique just described to the determination of two or three angles characteristic of the angular position of a body to be monitored by using two or three transmitters with retroreflectors respectively oriented on said body in different directions.

For determining the attitude of an object, viz. the three angular coordinates, one optical encoder with retroreflector at least, comprising the association of an interferential filter plate and of a polarizer plate described with reference to FIG. 8, and another encoder with an interferential filter plate oriented in such manner that the two interferential filters are not parallel to each other, are placed on the object. For example, there are placed on the object two optical encoders comprising a retroreflecting trihedral the angular range of which is of ±30° and one orients, on the one hand, the trihedrals so that their optical axes are parallel, and on the other hand the interferential filter plates so that they form between themselves an angle close to 132° and are inclined by about 55° on the axis of the trihedrals.

In these various embodiments, the invention is applicable to numerous remote angle measurements and particularly to the determination of one of several "attitude" angles of a flying object. The attitude of an object relative to a fixed reference mark can be defined by three angles, two of which allowing detecting the direction of an axis related to said mobile (longitudinal axis), the third angle which is characteristic of the objects attitude being then its rotation angle about said axis.

The technique described is applicable to objects which are totally or partly free relative to the reference system to which one desires to relate their movements, as for example models of airships subjected to tests in wind tunnels and of which one wishes to measure and/or servo-control the angular position. It is not sensitive to the distance variation between said object and the observation station insofar as the light issued from the encoder can de detected.

Further detection means of the characteristic angle coded in the frequency spectrum of the resultant beam can of course also be envisaged. Thus, it is also possible to use as detector a combination of an interferential filter identical to that of the encoder and of a light energy sensor at the outlet of said filter with means for driving said filter by varying periodically the incidence of the luminous rays issued from the resultant beam on the second interferential filter. A phase detection system produced by using electronic means of known type can be connected at the output of the sensor responsive to the light energy for detecting phase variations of the extremum signal emitted by the latter, consecutive to a variation of the angular position of the mobile provided with the encoder according to the invention. This alternative embodiment is applicable for example to the study of the movement of parts subjected to mechanical vibrations. In this case, at least one optical encoder according to the invention is placed on the part, and the phase variations of the extremum signals are measured from a distance in order to derive therefrom the attitude and the direction of the vibrations movement.

I claim:

1. Apparatus for remotely measuring an angle characteristic of the angular position or attitude of a body to which is attached an optical encoder including a first interference filter, said apparatus comprising: a light emitter adapted for projecting a beam of polychromatic light, with an incidence which is function of the attitude of said body, on the optical encoder for producing at the outlet of said encoder a resultant beam of light having a frequency spectrum which is a function of said incidence; and a receiver of the resultant beam, said receiver including a detector responsive to the frequency spectrum of the light composing said beam for determining said characteristic angle, said detector comprising a second interference filter, means for varying the incidence of rays from the resultant beam relative to said second interference filter and means for measuring the incidence corresponding to an extremum of the level of the light energy detected at the outlet of said second interference filter.

2. The apparatus of claim 1 wherein said means for varying the incidence of rays is driven means for periodically varying said incidence.

3. Apparatus for remotely measuring an angle characteristic of the angular position or attitude of a body to which is attached an optical encoder including a first interference filter, said apparatus comprising: a light emitter adapted for projecting a beam of polychromatic light, with an incidence which is function of the attitude of said body, on the optical encoder for producing at the outlet of said encoder a resultant beam of parallel rays of light having a frequency spectrum which is a function of said incidence; and a receiver of the resultant beam, said receiver including a detector responsive to the frequency spectrum of the light composing said beam for determining said characteristic angle, said detector comprising a second interference filter means for deriving a beam of non-parallel rays from the resultant beam of parallel rays and for directing such beams on to said second interference filter, and energy level responsive means comprising an array of detectors arranged at the outlet of said second interference filter according to an arrangement such that each of said detectors may only receive rays transmitted by said second interference filter which correspond to a determined respective incidence of non-parallel rays of said beam, so that the position of an excited detector in said array provides a measurement of the incidence of the rays which have been transmitted by the filter.

4. Apparatus for remotely measuring an angle characteristic of the angular position or attitude of a body to which is attached an optical encoder including a first interference filter, said apparatus comprising: a light emitter adapted for projecting a beam of polychromatic light, with an incidence which is function of the attitude of said body, on the optical encoder for producing at the outlet of said encoder a resultant beam of light having a frequency spectrum which is a function of said incidence; and a receiver of the resultant beam, said receiver including a detector responsive to the frequency spectrum of the light composing said beam for determining said characteristic angle, said detector comprising a second interference filter which is rotatably mounted, and means for controlling the orientation of said second interference filter in response to the measurement of said characteristic angle.

5. Apparatus for remotely measuring an angle characteristic of the angular position or attitude of a body comprising:

an optical encoder attached to the body, said optical encoder including a light polarizer and a first interference filter; a light emitter adapted for projecting a beam of polychromatic light, with an incidence which is function of the attitude of said body, on the optical encoder for producing at the outlet of said encoder a resultant beam of light having a frequency spectrum which is a function of said incidence; and a receiver of the resultant beam, said receiver including an orientable polarized light analyser adapted for detecting the direction of the polarization plane of the resultant beam imposed by said polarizer in the optical encoder and a detector responsive to the frequency spectrum of the light composing said beam for determining said characteristic angle.

6. Apparatus for remotely measuring an angle characteristic of the angular position or attitude of a body comprising: optical encoder means attached to said body, said optical encoder means including first and second optical encoders oriented in different directions, each of said optical encoders including an interference filter; a light emitter for projecting a beam of polychromatic light with an incidence which is a function of the attitude of the body on both of said optical encoders for producing at the outlet of said optical encoder means two resultant beams of light; and first and second detector means, each responsive to the frequency spectrum of the light comprising a different one of the resultant beams of light for determining the angle characteristic.

7. The apparatus of claim 1, 2, 3, 4, 5 or 6 wherein said light emitter includes means for emitting white light.

8. The apparatus of claim 1, 2, 3, 4 or 5 wherein the optical encoder comprises means for sending a resultant beam substantially along the same direction as an emitted beam.

* * * * *